March 11, 1947.    L. MENZL    2,417,210
TEETH FOR ROLL SCRAPERS AND TRASH BAR PLATES
Original Filed Feb. 29, 1940
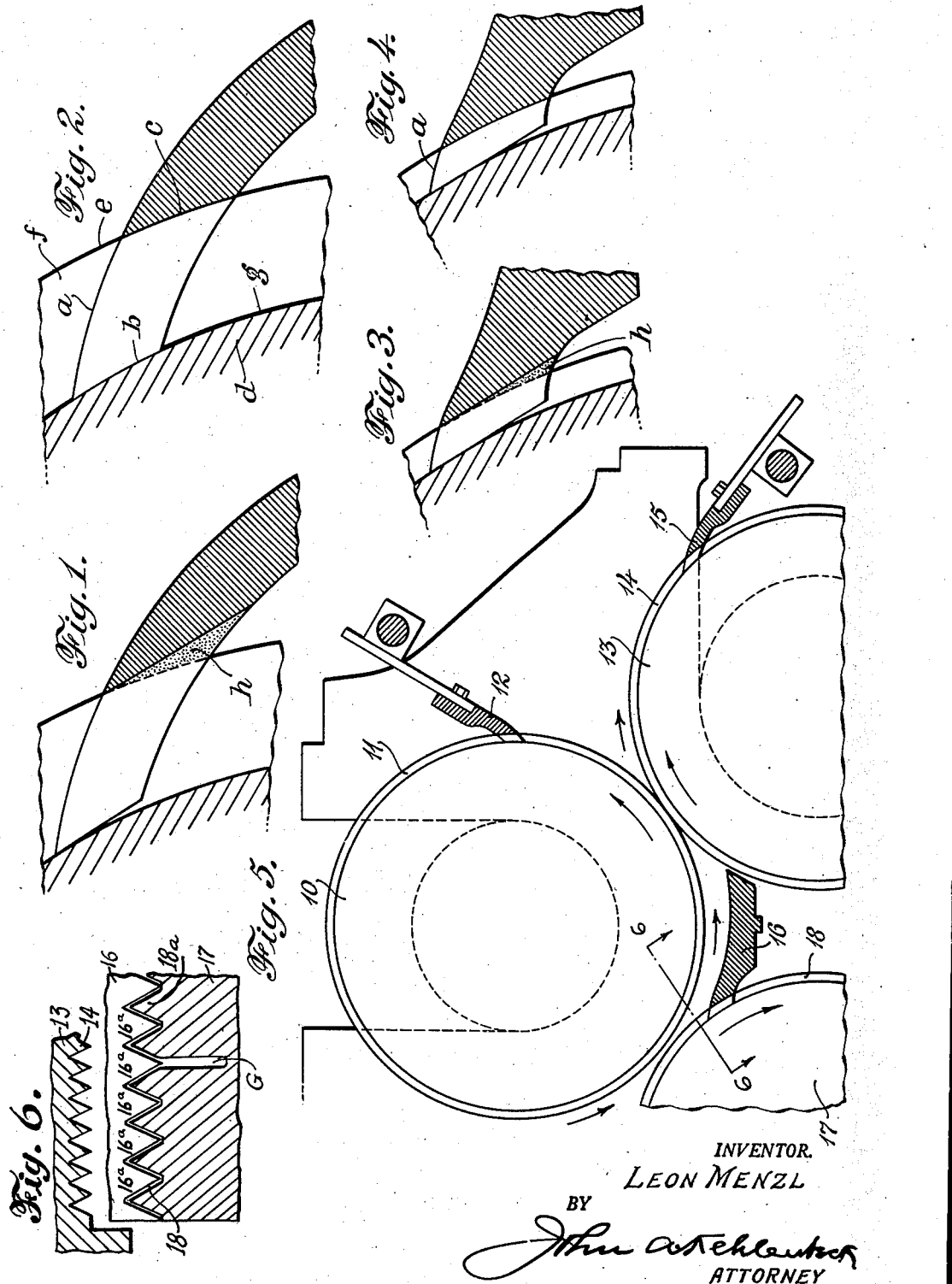
INVENTOR.
LEON MENZL
BY
ATTORNEY Patented Mar. 11, 1947

2,417,210

UNITED STATES PATENT OFFICE 2,417,210

TEETH FOR ROLL SCRAPERS AND TRASH BAR PLATES

Leon Menzl, Crestwood, N. Y., assignor to Marlo Company, New York, N. Y., a copartnership consisting of Harold Case and Charles Gersman Original application February 29, 1940, Serial No. 321,386. Divided and this application September 24, 1943, Serial No. 503,637

1 Claim. (Cl. 100—47)

The invention relates to scraper tip and trash plate teeth for removing material from the grooved surfaces of mechanical rolls and more particularly of cane sugar mill rolls. Heretofore it has been customary to cut such teeth with a shaper tool or milling cutter advancing in straight lines whereby triangular teeth were produced having straight point lines and straight base or root lines in parallel relation to each other.

The object of the invention is to provide teeth of the indicated type in a novel form whereby operative efficiency is increased and waste of material in the cutting of said teeth is reduced to a minimum.

Other more specific objects will appear from the description hereinafter and the feaures of novelty will be pointed out in the claim.

The present application is a division of another application filed by me in the United States Patent Office on February 29, 1940, Serial No. 321,386, which has issued as Patent No. 2,334,276, dated November 16, 1943.

In the accompanying drawings which illustrate examples of the invention without defining the limits thereof, Figs. 1 and 2 are diagrammatic views illustrating respectively the old form of scraper teeth and the instant novel form thereof; Figs. 3 and 4 are corresponding views respectively of the old and new trash bar plate teeth; and Fig. 5 is a diagrammatic view of a cane sugar mill showing scraper bars and trash bar plate with the novel teeth in use. Fig. 6 is a sectional view on the line 6—6 of Fig. 5. In Fig. 5, the arrows indicate the direction of movement of the material.

In this improved tooth $a$, the point line $b$ and the line at the root of the tooth or base line $c$ are preferably both curved in arcs corresponding with the radius of the mill roll $d$ with which said tooth is intended to cooperate; that is the radius of curvature of the base line $c$ of the tooth $a$ is equal to the radius from the center of the mill roll $d$ to the peripheral surface thereof, or in other words to the point line $e$ of a given mill roll tooth $f$, and the radius of curvature of the point line $b$ of the tooth $a$ is the same as the radius from the center of the mill roll $d$ to the base of the mill roll tooth $f$ or in other words to the root $g$ of a given groove of the mill roll $d$. In some cases, however, the point line $b$ of the tooth $a$ may be a straight line which in practice extends in approximate tangential relation to the root $g$ of the mill roll $d$ as shown in Fig. 4.

The purpose of developing the novel tooth $a$ is to provide a tooth which meshes perfectly with the grooves of the mill roll $d$; in other words, the novel tooth $a$ fits perfectly the mill roll groove at the point line $b$, the root or base line $c$, as well as at the sides of said tooth $a$.

As clearly shown in Figs. 1 and 3, it is evident that in a tooth generated by a linearly reciprocating tool, considerable material is removed at the root or base line of the tooth as indicated at $h$ with resulting excessive waste. Also a tooth thus formed at best has contact only with the side surfaces of the associated mill roll teeth and because of its straight point and base lines does not conform to the surface curvature of the mill roll or its groove at the base line thereof. As illustrated in Figs. 2 and 4, it is evident that with the novel tooth $a$ having the desired curved base line $c$ no excessive waste of material occurs and at the same time a perfect co-operating fit with the point line $e$ of the mill roll tooth and the associated groove of the mill roll is secured; if the point line $b$ of the tooth $a$ is also curved, perfect fit with the base line $g$ of the mill roll groove is also attained. It will be understood that the teeth of the roll scrapers and of the trash bar plates may be correspondingly developed to include the aforesaid novel features.

In Fig. 5 which diagrammatically illustrates a cane sugar mill, 10 represents the top roll, the grooves 11 of which are cleaned by the teeth of the top roll scraper 12, and 13 indicates the side roll of said mill, the grooves 14 of the roll 13 being cleaned by the teeth of the side roll scraper 15. The trash bar plate 16 whereby material is conducted from the front roll 17 to the side roll 13 beneath the top roll 10, has its teeth 16a extending into meshing engagement with the grooves 18 between the teeth 18a of the front roll 17 for cleaning said grooves 18. The recess $G$ in Fig. 6 shows one of the conventional recesses in roll 17, into which the juice flows. It will be understood that the scrapers 12 and 15, and the trash bar plate 16 are mounted in proper place in the cane sugar mill in any conventional and well-known way.

With the novel teeth, excessive waste of material in cutting is avoided, as previously stated herein, and a perfect surface mesh with the grooves of the particular mill roll is effected whereby any material which may be in the grooves of said mill roll is removed therefrom in a most efficient manner.

Various changes in the specific forms shown and described may be made within the scope of the claims without departing from the spirit of the invention.

I claim:

For use in combination with a cylindrical roll of a sugar mill which has circumferential V-shaped grooves, a scraper member which has teeth which mesh perfectly with said grooves, said teeth fitting said grooves at the respective point lines and base lines of said teeth and also at the sides of said teeth.

LEON MENZL.

REFERENCES CITED

The following references are of record in the file of this patent:

UNITED STATES PATENTS

| Number | Name | Date |
|---|---|---|
| 733,125 | Bekker | July 7, 1903 |
| 1,698,088 | Franke | Jan. 8, 1929 |
| 1,787,937 | Dunn | Jan. 6, 1931 |
| 2,061,196 | Hymers | Nov. 17, 1936 |
| 2,030,982 | Grossenbacher | Feb. 18, 1936 |